May 7, 1935.  C. H. CARPENTER ET AL  2,000,579
MILK TESTING DEVICE
Filed Sept. 20, 1934
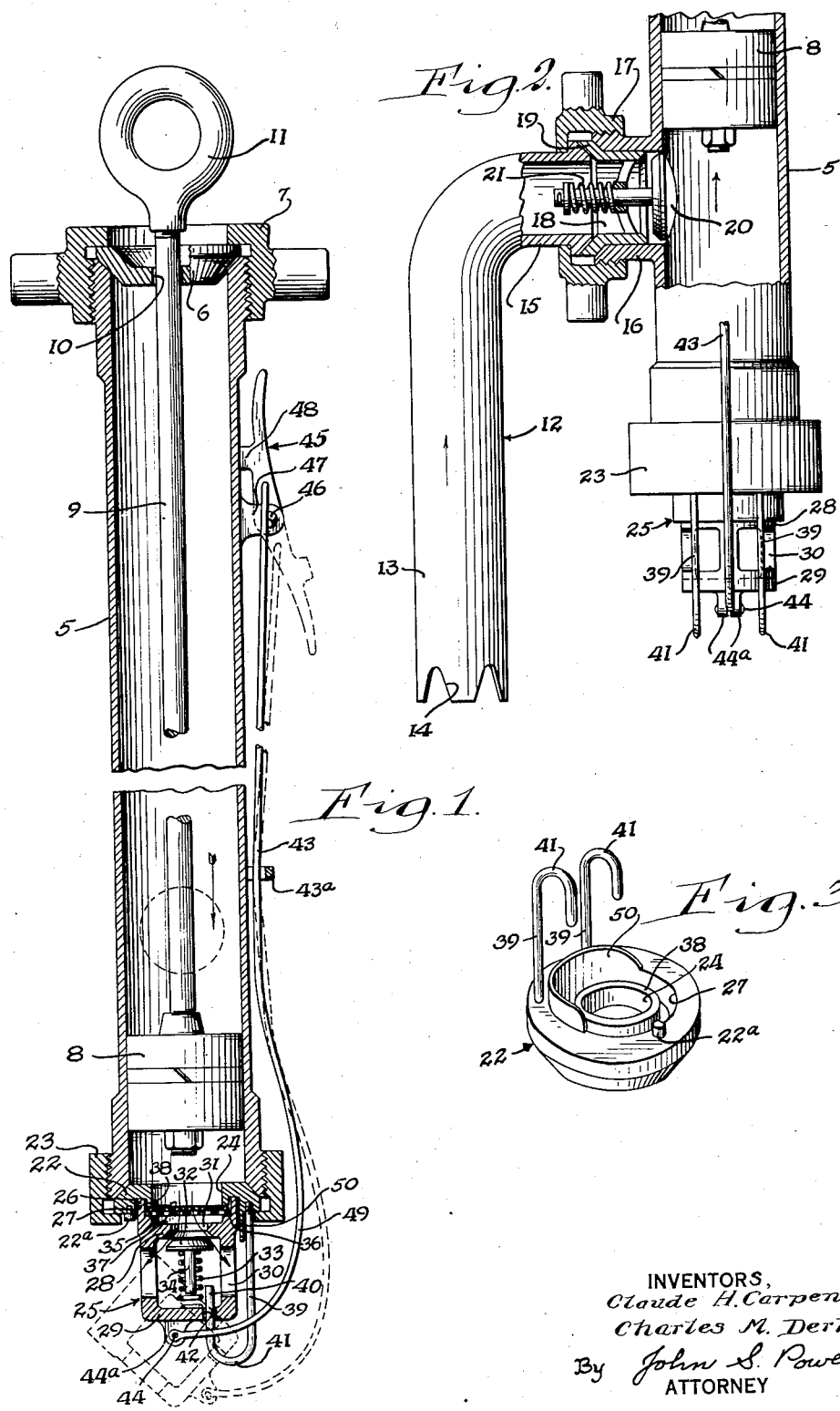
INVENTORS,
Claude H. Carpenter
Charles M. Derby
By John S. Powers
ATTORNEY Patented May 7, 1935

2,000,579

UNITED STATES PATENT OFFICE 2,000,579

MILK TESTING DEVICE

Claude H. Carpenter and Charles M. Derby, Frewsburg, N. Y.

Application September 20, 1934, Serial No. 744,858

8 Claims. (Cl. 73—51)

This invention relates to a device which, although available for other purposes, is of particular utility in connection with the testing of milk to determine the sediment content and more particularly the invention is concerned with a device in which a predetermined volume of milk is caused to pass through a filter element to effect the separation of the suspended sediment, the said element being removable from the device whereby it may be inspected upon completion of the test.

One object of the invention is to provide for facility in removing and replacing the filter elements.

A further object is to provide a device which is so constructed that it is unnecessary to handle those parts which are immersed in the milk during the testing operations, whereby contamination of the milk is avoided.

A still further object is a novel arrangement of the parts of the device, whereby simplicity and economy in construction are obtained.

The invention is illustrated in the accompanying drawing, in which:

Figure 1 is a longitudinal central section through the device.

Figure 2 is a view, partially in section of the lower end of the device, the latter being turned at right angles with respect to the position shown in Figure 1.

Figure 3 is a perspective view of the part of the device against which the filter element is held.

The device, as illustrated, includes a barrel-like body 5 which is closed at one end by a disk 6 and a flanged ring 7. A piston 8, which is arranged within the body 5, is connected to one end of a piston rod 9. The opposite end of the said rod extends through an opening 10 which is formed in the disk 6 and carries a handle 11.

The device also includes an intake pipe 12 (Figure 2) through which the milk to be tested enters the body 5 during upward movements of the piston 8. The said pipe has a vertical leg 13 which may be rested upon the bottom of the container from which the milk is to be withdrawn, the bottom edge of the leg 13 preferably being notched as at 14 in order to facilitate entry of the milk into the intake pipe when the device is arranged as described. The intake pipe 12 includes an angularly extending leg 15 which is secured to a lateral extension 16 of the body 5 by a union 17. A valve seat insert 18 is arranged within the body extension 16 and is held in position by a flange 19 which is secured between the leg 15 of the intake pipe and the extension 16. An intake valve 20, which is carried by the insert 18, is normally held closed by a spring 21. The said valve opens to permit milk to enter the body 5 from the intake pipe as the piston 8 moves in the direction of the arrow (Figure 2) but closes during movements of the piston in the opposite direction to prevent discharge of the milk through the said pipe.

A disk-like member 22 is secured against the lower end of the body 5 by a flanged ring 23, the abutting edges of the said body and member being beveled and co-operating to provide a sealed joint. The member 22 is formed with a central opening 24 and carries a closure member 25 which normally covers the said opening, the closure member, as illustrated, being formed or provided with an annular flange 26 which fits in an annular recess 27 formed in the underside of the member 22 and including top and bottom walls 28 and 29, respectively, which are connected by bars 30. The top wall 28 of the closure member is formed with an outlet opening 31 which communicates with the interior of the body 5 and which is normally closed by a valve 32. A spring 33 is arranged upon the stem 34 of the valve between the head of the latter and the bottom wall 29 of the closure member, the said valve remaining closed during upward movements of the piston 8 and opening against the action of the spring 33 during downward movements of the said piston. During such downward movements of the piston the milk, which has entered the device through the intake pipe 12 during the upward movements of the piston, is discharged from the device through the outlet opening 31.

Means is provided for removing the sediment from the milk which enters the body 5. To this end the closure member 25 carries a screen 35. The latter is supported by its margins, and in spaced relation with respect to the top wall 28 of the closure member, upon a ledge 36 which is formed in the flange 26. A filter element 37 of suitable material is arranged upon the screen 35, the latter preferably being permanently secured in the closure member. The filter element is substantially coextensive with the screen 35 and is adapted to be removed upon completion of a test. As illustrated, and preferred, the parts are so designed that the marginal portions of the filter element are engaged between the screen 35 and an annular rib 38 of the member 22, whereby to secure the filter element in position when the closure member occupies the full-line position shown.

It will be apparent that as the milk under test approaches the outlet opening 31 it will be caused to pass through the filter element 37 and the screen 35, the sediment suspended in the milk collecting upon the said element in the form of a deposit and the filtered milk passing through the outlet opening 31 and the openings between the bars 30.

In accordance with the invention means is provided whereby upon completion of a test the filter element 37 may be removed and a new element substituted for it. To this end the member 22 carries a pair of depending rods 39 which are turned up at their ends to provide vertical legs 40 and form curved portions 41 which connect the vertical legs to the main or body portions of the rods. The legs 40 pass through openings 42 which are formed in the bottom wall 29 of the closure member. An actuating rod 43 is pivotally connected at its lower end to a pin 44 which is mounted between a pair of depending lugs 44a formed upon the underside of the bottom wall 29 of the closure member. The said rod passes through a guide member 43a which is suitably secured to the body 5 and at its upper end it is connected to a lever 45. The latter is pivotally mounted upon a pin 46 which is supported between the opposing ears of a lug 47 and is formed with a foot 48 which engages the side of the body 5, as shown in full lines in Figure 1, when the closure member 25 is in its fully closed position. The actuating rod 43 is preferably resilient and it is bent outwardly at its lower end as indicated at 49 so that there is a substantial clearance between it and the flanged ring 23 and the bottom wall 29 of the closure member.

In the use of the device, assuming that a filter element has been placed in the closure member as shown, the device is immersed in the milk to be tested and the intake pipe 12 is rested upon the bottom of the container. The piston 8 is then operated to effect passage of the desired volume of milk through the device, a predetermined volume of milk entering the device through the intake pipe 12 during each upward movement of the piston 8 and being returned to the container during each downward movement of the said piston.

When the desired volume of milk has been caused to pass through the device it is withdrawn from the container and the lever 45 is moved to the position indicated in dotted lines in Figure 1. As the lever 45 is moved to this position the actuating rod 43 is moved downwardly to carry the closure member 25 with it, the side walls of the recess 27 and the head of a pin 22a preventing angular movement of the closure member. After the top edge of the flange 26 moves below the lower edge of the head of the pin 22a, and as the bottom wall 29 of the closure member approaches and follows around the curved portions 41 of the rods 39, the top of the said closure member swings outwardly to the position indicated in dotted lines (Figure 1). When the closure member 25 occupies this position the filter element 37 may be removed and inspected to determine the sediment content of the milk under test, an unused filter element preferably being substituted for the element which is removed while the closure member is open. When it is desired to return the closure member to its closed position the lever 45 is moved to the full-line position shown in Figure 1. During the initial part of the return movement of the lever 45 the closure member pivots upon the curved portions 41 of the rods 39 until the flange 26 of the closure member engages a guide flange 50 which is formed upon the under side of the member 22. Thereafter a further movement of the lever in the same direction causes the flange 26 of the closure member to move along the guide flange 50 and into the annular recess 27. Preferably the parts are so formed that the closure member reaches its fully closed position when the lever 45 has been moved approximately half-way between the dotted and full-line positions shown. During the final part of the return movement of the lever, therefore, the curved portion 49 of the actuating rod is flexed and its curvature is reduced. Hence as the rod 43 passes beyond the pin 46 in the direction of the body 5 its inherent resiliency causes the lever to move toward the said body until the foot 48 engages it. The closure member is thus locked in position and the device is conditioned to test the contents of another container, it being understood that when the lever 45 is subsequently operated to effect the removal of the filter element, the flexed portion 49 of the actuating rod 43 returns to its normal shape.

The device is so constructed that when the body 5 is immersed in the milk as described the lever 45 will be located above the level of the milk. It will be apparent, therefore, that the closure member 25 can be manipulated to enable the removal and replacement of the filter elements without the necessity of the user handling those parts of the device which are immersed in the milk during the testing operation. Contamination of the milk is, therefore, avoided. The closure actuating mechanism described has the further advantage that the removal and replacement of the filter elements can be accomplished rapidly, thereby increasing the rate at which the tests can be made.

I claim as my invention:

1. A testing device of the character described including a body having an inlet, the lower end of said body being adapted to be immersed in the liquid to be tested, a member carried by said lower end of said body, said member carrying a filter element, a plunger within said body for drawing liquid thereinto through said inlet and for causing it to pass through said filter element prior to its discharge from said body, a control element carried by the said body at a point which is located above the level of the liquid when the lower end of said body is immersed as described and means connecting said member and said element, whereby the latter may be operated to move said member so that said filter element may be removed.

2. A testing device of the character described including a tubular body having an inlet, the lower end of said body being adapted to be immersed in the liquid to be tested, a member carried by said lower end of said body, a filter element carried by said member, a plunger within said body for drawing liquid thereinto through said inlet and for causing it to pass through said filter element prior to its discharge from said body, a lever carried by the said body at a point which is located above the level of the liquid when the lower end of the body is immersed as described and a rod connecting said member and said lever, said lever being operable to move said member so that said filter element may be removed.

3. A testing device of the character described including a tubular body having an inlet, the lower end of said body being adapted to be immersed in the liquid to be tested, a member carried by said lower end of said body, a filter element carried by said member, a plunger within said body for drawing liquid thereinto through said inlet and for causing it to pass through said filter element prior to its discharge from said body, a lever carried by the said body at a point which is located above the level of the liquid when the lower end of the body is immersed as described and a rod connecting said member and said lever, said lever being movable in one direction to move said member so that said filter element may be removed and being movable in the opposite direction to return said member to its original position and lock it in such position.

4. A testing device of the character described including a tubular body having an linet, an intake valve associated with said inlet, the lower end of said body being adapted to be immersed in the liquid to be tested, a member carried by said lower end of said body, said member having an outlet opening, an exhaust valve associated with said opening, a plunger within said body for drawing liquid thereinto through said inlet and for discharging it from said body through said outlet opening, a filter element carried by said member through which the liquid passes as it is discharged from said body, a control element carried by the said body at a point which is located above the level of the liquid when the lower end of said body is immersed as described and means connecting said member and said element, whereby the latter may be operated to move said member so that said filter may be removed.

5. A testing device of the character described including a tubular body having an inlet, the lower end of said body being adapted to be immersed in the liquid to be tested, a movable member, guide means connecting said movable member to the lower end of said body, said movable member having an opening, a plunger within said body for drawing liquid thereinto through said inlet and for discharging it from said body through said opening, a filter element carried by said movable member through which the liquid passes as it is discharged from said body, a control element carried by the upper end of said body at a point which is located above the level of the liquid when the lower end of said body is immersed as described and a rod connecting said movable member and said control element, said control element being operative to move said movable member along said guide means and then to tilt it angularly with respect to said body, whereby to permit the removal of said filter element.

6. A testing device of the character described including a tubular body having a lower end which is adapted to be immersed into the container of the liquid to be tested, an intake pipe carried by said body and adapted to be rested upon the bottom of said container, a member carried by the lower end of said body, said member having an opening, a plunger within said body for drawing liquid thereinto through said intake pipe and for discharging it from said body through said opening, a filter element carried by said member through which the liquid passes as it is discharged from said body, a control element carried by the upper end of said body at a point which is located above the level of the liquid when said intake pipe rests upon the bottom of said container and means connecting said member and said element, whereby the latter may be operated to move said member so that said filter element may be removed.

7. A testing device of the character described including a tubular body having an inlet, an intake valve associated with said inlet, the lower end of said body being adapted to be immersed in the liquid to be tested, a member which normally closes the lower end of said body, said member having top and bottom walls, an outlet opening formed in said top wall, an exhaust valve associated with said opening, a filter element carried by said member in front of said outlet opening, a plunger within said body for drawing liquid thereinto through said inlet and for discharging it from said body through said outlet opening, openings formed in the bottom wall of said member, a pair of guide rods having upturned ends which extend through said openings, a control element carried by said body at a point which is located above the level of the liquid when the lower end of said body is immersed as described and a rod connecting said element and said member, whereby the latter may be moved downwardly along the upturned ends of said rods and tilted angularly with respect to said body to enable removal of said filter element.

8. A testing device of the character described including a tubular body having an inlet, the lower end of said body being adapted to be immersed in the liquid to be tested, a member carried by the lower end of said body, said member having an opening, a plunger within said body for drawing liquid thereinto through said inlet and for discharging it from said body through said opening, a filter element carried by said member through which the liquid passes as it is discharged from said body, a lever pivotally mounted upon the upper end of said body at a point which is located above the level of the liquid when the lower end of the said body is immersed as described, a rod connecting said member and said lever, said lever being movable in one direction to move said member so that said filter element may be removed and being operative upon movement in the opposite direction to return said member to its original position, said rod having a curved resilient section and being of such a length that during the initial part of the return movement of said lever said member is returned to its original position and during the final part of the return movement of said lever said curved portion is flexed and said lever engages said body, said rod passing beyond the pivotal mounting of said lever in the direction of said body as the curved portion of said rod is flexed and as said lever engages said body, thereby locking said member in said original position.

CLAUDE H. CARPENTER.
CHARLES M. DERBY.